US008938732B2

(12) United States Patent
Levine et al.

(10) Patent No.: US 8,938,732 B2
(45) Date of Patent: Jan. 20, 2015

(54) DYNAMICALLY GENERATING INSTALLABLE SOFTWARE ARTIFACTS IN A CANONICAL FORM

(75) Inventors: Brian J. Levine, Chelmsford, MA (US); Philippe Riand, Chelmsford, MA (US); Jeffrey T. Calow, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1521 days.

(21) Appl. No.: 11/556,819

(22) Filed: Nov. 6, 2006

(65) Prior Publication Data

US 2008/0109801 A1    May 8, 2008

(51) Int. Cl.
*G06F 9/445* (2006.01)

(52) U.S. Cl.
CPC .. *G06F 8/65* (2013.01); *G06F 8/60* (2013.01); *G06F 8/61* (2013.01)
USPC ............................ 717/174; 717/178; 717/171

(58) Field of Classification Search
CPC ...................................... G06F 8/60; G06F 8/61
USPC .......................................... 717/178, 171, 174
See application file for complete search history.

(56) References Cited

U.S. PATENT DOCUMENTS

| 5,418,957 | A  | * | 5/1995  | Narayan ........................ | 717/113 |
| 6,282,711 | B1 | * | 8/2001  | Halpern et al. ................ | 717/175 |
| 6,832,373 | B2 | * | 12/2004 | O'Neill ......................... | 717/171 |
| 6,950,850 | B1 | * | 9/2005  | Leff et al. ..................... | 709/203 |
| 2003/0182470 | A1 | | 9/2003 | Carlson et al. | |
| 2003/0220993 | A1 | | 11/2003 | Blizniak et al. | |
| 2004/0100494 | A1 | | 5/2004 | Ragoler et al. | |
| 2005/0080640 | A1 | | 4/2005 | Bhaskaran et al. | |
| 2005/0108181 | A1 | | 5/2005 | Butler et al. | |
| 2005/0204354 | A1 | | 9/2005 | Sundararajan et al. | |
| 2005/0204367 | A1 | | 9/2005 | Minium, Jr. et al. | |
| 2006/0047974 | A1 | | 3/2006 | Alpern et al. | |

OTHER PUBLICATIONS

Eichberg, et al; XIRC: A Kernel for Cross-Artifact Information Engineering in Software Development Environments; Proceedings of the 11th Working Conference on Reverse Engineering in Software Development Environments (WCRE '04), IEEE 2004.
Kanomata, Yuzo; Creating an Eclipse Update Site; http://calla.ics.uci.edu/mrsg/mail/msg0038.html/ Nov. 2, 2006.
Glozic, Dejan, et al; How to Keep Up to Date; Eclipse Corner Article; http://eclipse.org/articles/Articlel-Update/keeping-up-to-date html, Nov. 2, 2006.

* cited by examiner

*Primary Examiner* — Phillip H Nguyen
(74) *Attorney, Agent, or Firm* — Steven M. Greenberg, Esq.; CRGO Law

(57) ABSTRACT

Embodiments of the present invention address deficiencies of the art in respect to application deployment and provide a novel and non-obvious method, system and computer program product for deploying installable software artifacts in canonical form. In one embodiment of the invention, a method for deploying installable software artifacts in canonical form can include storing artifacts in platform independent canonical form. Thereafter, the method can include receiving a request from a client for first time provisioning or update to a specified application for a specific platform, locating the stored artifacts according to the specified application, dynamically generating a feature from the stored artifacts for the specific platform, and first time provisioning or updating the specified application in the client with the dynamically generated feature.

16 Claims, 2 Drawing Sheets

DYNAMICALLY GENERATING INSTALLABLE SOFTWARE ARTIFACTS IN A CANONICAL FORM

BACKGROUND OF THE INVENTION

1. Field of the Invention

The present invention relates to the field of software development and deployment and more particularly to deploying new or updated software artifacts from an integrated development environment to an update repository and then deploying the updates to set of heterogeneous client platforms.

2. Description of the Related Art

Software development relates to the creation of a software application and the deployment of the application to the end user. Historically, the term "software application" referred to a single computer program incorporating both program logic and supporting resources including user interface elements and data files. Over time, the concept of the software application matured into a carefully orchestrated arrangement of program objects and supporting resources. To manage this careful orchestration, sophisticated integrated development environments were created and distributed into the marketplace. Modern forms of the integrated development environment permit team collaboration and document versioning in addition to the core function of arranging components and resources into a single application.

Until recently, incremental improvements in a software application were reflected in different, discrete versions of the application which were deployed periodically through physical distribution channels such as computer software retail outlets and authorized consultants. More recently, the advancement of computer communications networks have permitted the widespread and repeated deployment of applications through different versions over private networks and the global Internet. The most sophisticated of computing environments now permit the private distribution of applications to internal users through secure, private networks.

Software applications no longer refer to shrink-wrapped products distributable to the public at large. Given the complexity of different instances of the modern business model, very seldom can a single application or even a collection of widely distributed applications satisfy the operational needs of an organizational end user. Consequently, more frequently, organizations have turned to collaborative environments where custom components can be assembled on an ad hoc basis by the organization itself in order to produce in the aggregate a targeted computing solution able to meet the needs of the organization. One such collaborative environment is the Lotus® Workplace® environment.

Collaborative environments often provide internal development tools which allow the end user to specify the assembly of software artifacts into an application and to custom develop those artifacts. Today, many portal solutions supports the assembly of artifacts into a web based application and the makes the application available to browser based users. In addition, rich client projections of this portal model allow for the deployment of these applications to desktop based end users. An example of this is the projection of the Workplace Collaboration Services Server® into the Workplace® Managed Client®, both manufactured by IBM Corporation of Armonk, N.Y. (Workplace, Collaboration Services Server and Managed Client are all trademarks of IBM Corporation).

The Workplace Managed client is based on the Eclipse™ Rich Client Platform. (Eclipse is a trademark of the Eclipse Foundation) Generally, in the Eclipse rich client platform environment, once an application has been assembled, the application can be deployed and updated to each client user through a provisioning process such as the Eclipse "update site" component. Additional client hosting environments can also be made available on mobile devices using for example the Eclipse eRCP platform.

The update site involves the storage of artifacts in a repository. The application associated with the artifacts can be installed to a client by downloading the artifacts from the repository to the client. The process of deploying an application in this manner, however, is limited by the fact that these artifacts are static and must be in a form suitable for a specific target platform To that end, the update site must independently support each different possible specific target platform and each user must know a priori how to request the specific application in order to support the proper deployment for the specific target platform.

BRIEF SUMMARY OF THE INVENTION

Embodiments of the present invention address deficiencies of the art in respect to application deployment and provide a novel and non-obvious method, system and computer program product for deploying installable software artifacts in canonical form. In one embodiment of the invention, a method for deploying installable software artifacts in canonical form can include storing artifacts in platform independent canonical form. Thereafter, the method can include receiving a request from a client for first time provisioning or update of a specified application for a specific platform, locating the stored artifacts according to the specified application, dynamically generating a feature from the stored artifacts for the specific platform, and updating the specified application in the client with the dynamically generated feature.

In one aspect of the embodiment, storing artifacts in platform independent canonical form can include packaging the artifacts in an archive, uploading the archive to an artifact storage in a dynamic update site server, and associating the storage location in the dynamic update site server with an identifier for a specified application. One possible simple artifact storage system could be the file system on the dynamic update site server. A more sophisticated artifact storage system could involve a complete content management system. As such, receiving a request from a client for first time provisioning or update of a specified application for a specific platform can include receiving a request from a client for first time provisioning or update of a specified application for a specific platform, the request including an identifier for the specified application. In either case, locating the stored artifacts according to the specified application can include locating the stored artifacts by cross-referencing a table of application identifiers to deployment storage locations.

In another aspect of the invention, dynamically generating a feature from the stored artifacts for the specific platform can include dynamically generating one or more plug-ins from the stored artifacts for the specific target platform, a feature referencing the plug-ins and a descriptor referencing all the features for all applications available in the artifact storage. Accordingly, the method further can include caching each of the plug-ins, feature and descriptor for subsequent use in servicing a request for first time provisioning or update of the specified application/platform combination. Also, updating the specified application in the client with the dynamically generated feature can include returning the descriptor to the client for use in determining which artifacts to retrieve to the client.

In another embodiment of the invention, an application provisioning data processing system can be provided. The system can include a dynamic update site server configured for coupling to clients in a collaborative environment, and a portal server communicatively coupled to the dynamic update site server. The dynamic update site server can include multiple different deployment storage locations. Finally, an integrated development environment can be communicatively coupled to the dynamic update site server. The dynamic update site server can include an application deployment service and a dynamic update site servlet.

The application deployment service can include program code enabled to upload the artifacts in canonical form to a deployment storage location in the dynamic update site server. It is also possible to manually deploy the artifacts in canonical form to a deployment storage location in the dynamic update site server. The dynamic update site servlet, in turn, can include program code enabled to locate the artifacts according to an application identifier for a specified application, and to dynamically generate plug-ins, a feature for the plug-ins and a descriptor for first time provisioning or update of the specified application as requested by at least one of the clients. Optionally, the system further can include a cache of a feature, corresponding plug-ins and to a descriptor utilized for servicing subsequent requests for first time provisioning or updates to the specified application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for deploying installable software artifacts in canonical form. In accordance with an embodiment of the present invention, installable software artifacts can be stored in an update site repository in canonical form that is independent of the platform on which the artifacts are to be installed. The canonical form can be dynamically translated into a target-specific form at request time. In consequence, a single form of an artifact or update can be deployed only once to an update site that services many different types of target platforms.

Figure 1:
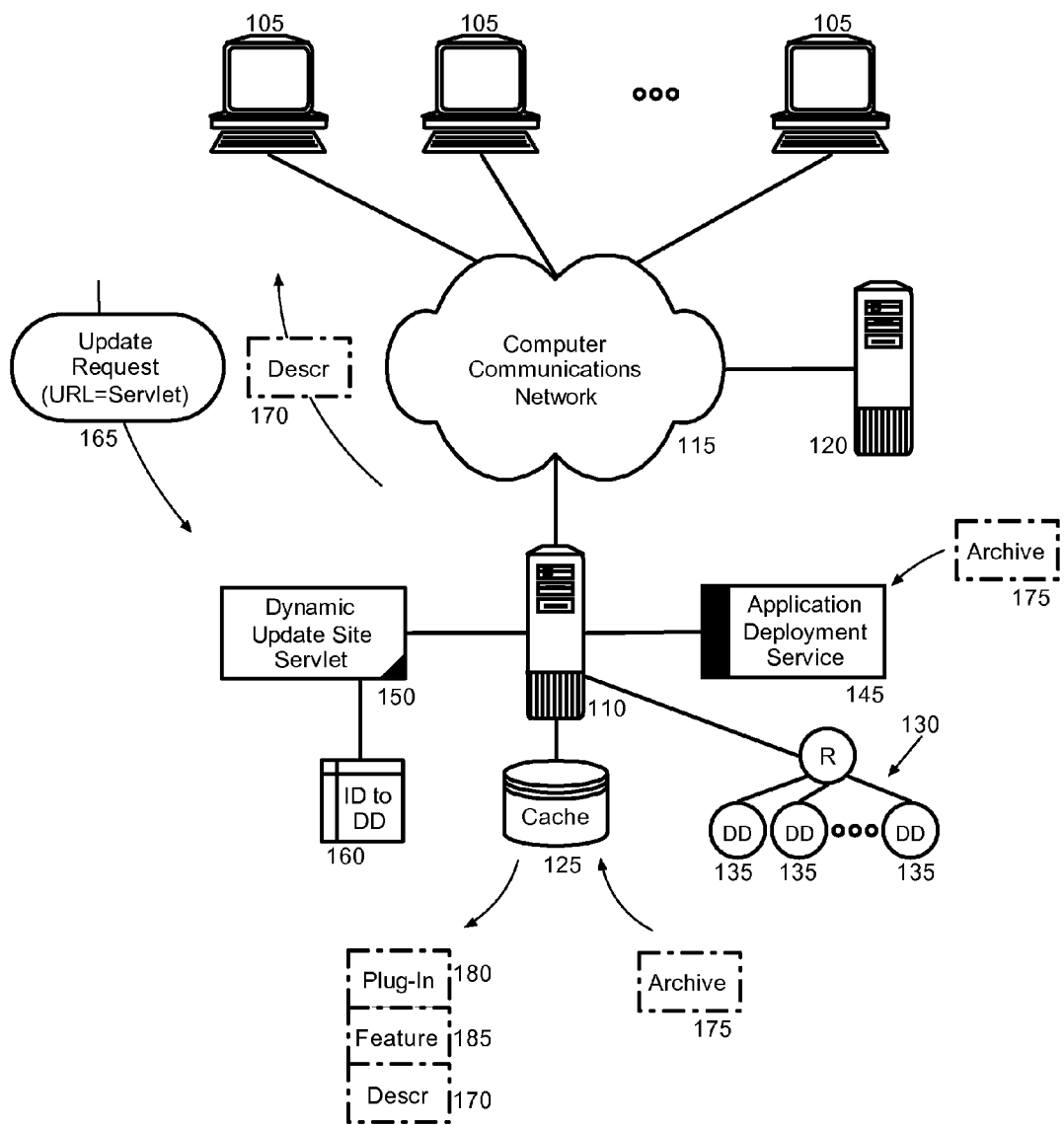
FIG. 1 is a schematic illustration of a development environment configured to deploy installable software artifacts from a canonical form; and, FIG. 2 is a flow diagram illustrating a process for deploying installable software artifacts in canonical form.

In further illustration, FIG. 1 is a schematic illustration of a collaboration environment configured to deploy installable software artifacts from a canonical form. As shown in FIG. 1, a dynamic update site server 110 can be provided to support collaborative computing for the environment in conjunction with a portal server 120 configured to deploy a portal interface for the collaborative environment to one or more clients 105 over a computer communications network 115. In this regard, the clients 105 can include client computing platforms configured for inclusion in the collaboration environment. The dynamic update site server 110 additionally can include one or more associated integrated development environments (not shown) able to provide customized components for the collaboration environment. To that end, the integrated development environment (IDE) can implement and extend the Eclipse IDE platform. Additionally, artifacts in canonical form can be manually deployed to the dynamic update site server without the use of an IDE.

The IDE can provide an interface and logic enabled to produce one or more artifacts for deployment as components to the clients 105. Accordingly, the IDE can communicate to an application deployment service 145 which is coupled to the dynamic update site server 110 and is configured to manage the deployment of new artifacts or updates to requesting ones of the clients 105. Notably, a dynamic update site servlet 150 further can be coupled to the dynamic update site server 110. The dynamic update site servlet 150 can include program code enabled to dynamically translate artifacts stored in canonical form in deployment artifact storage 130 of the dynamic update site server 110 into a target-specific form when requested by individual ones of the clients 105.

Specifically, the IDE can package the artifacts into an archive 175. Thereafter, the IDE can install the archive 175 into a specified deployment storage 135 in the dynamic update site server 110 through the operation of the application deployment service 145. Once deployed onto the dynamic update site server 110, the application utilizing the artifacts can be accessed by the clients 105 through the dynamic update site server 110 based on configuration in the portal server 120. Subsequently, during the provisioning process, the clients 105 can forward a first time provisioning or update request 165 not referring to a specific update site descriptor as known conventionally, but referring to the dynamic update site servlet 150 coupled to the dynamic update site server 110.

The first time provisioning or update request 165 can include a reference to a specific application identifier. Using the application identifier, the program code of the dynamic update site servlet 150 can cross reference a table 160 to identify the specified deployment storage location 135 for the canonical form of the application artifacts. Once the specified deployment location has been located for the update request 165, one or more plug-ins 180 can be dynamically generated that includes the contents of the specified canonical artifacts. Additionally a plug-in bundle (feature) 185 can be dynamically generated referring to the plug-ins 180 and any dependent plug-ins (not shown). Finally, a site descriptor 170 can be generated referring to the feature 185.

Each of the plug-ins 180, feature 185 and descriptor 170 can be written to cache storage 125 coupled to the dynamic update site server 110. Once in the cache storage 125, the plug-ins 180, feature 185 and descriptor 170 can be used to serve subsequent requests for that application/platform combination. Of course, when the corresponding application artifacts are re-deployed due to an update, the cache storage 125 can be invalided. In addition to the storage of the plug-ins 180, feature 185 and descriptor 170 in the cache storage 125, the descriptor 170 alone can be returned to the requesting clients 105. The requesting clients 105 in turn can utilize the descriptor 170 to proceed with the first time provisioning or update of the application by requesting the artifacts 155 referenced in the descriptor 170.

Figure 2:
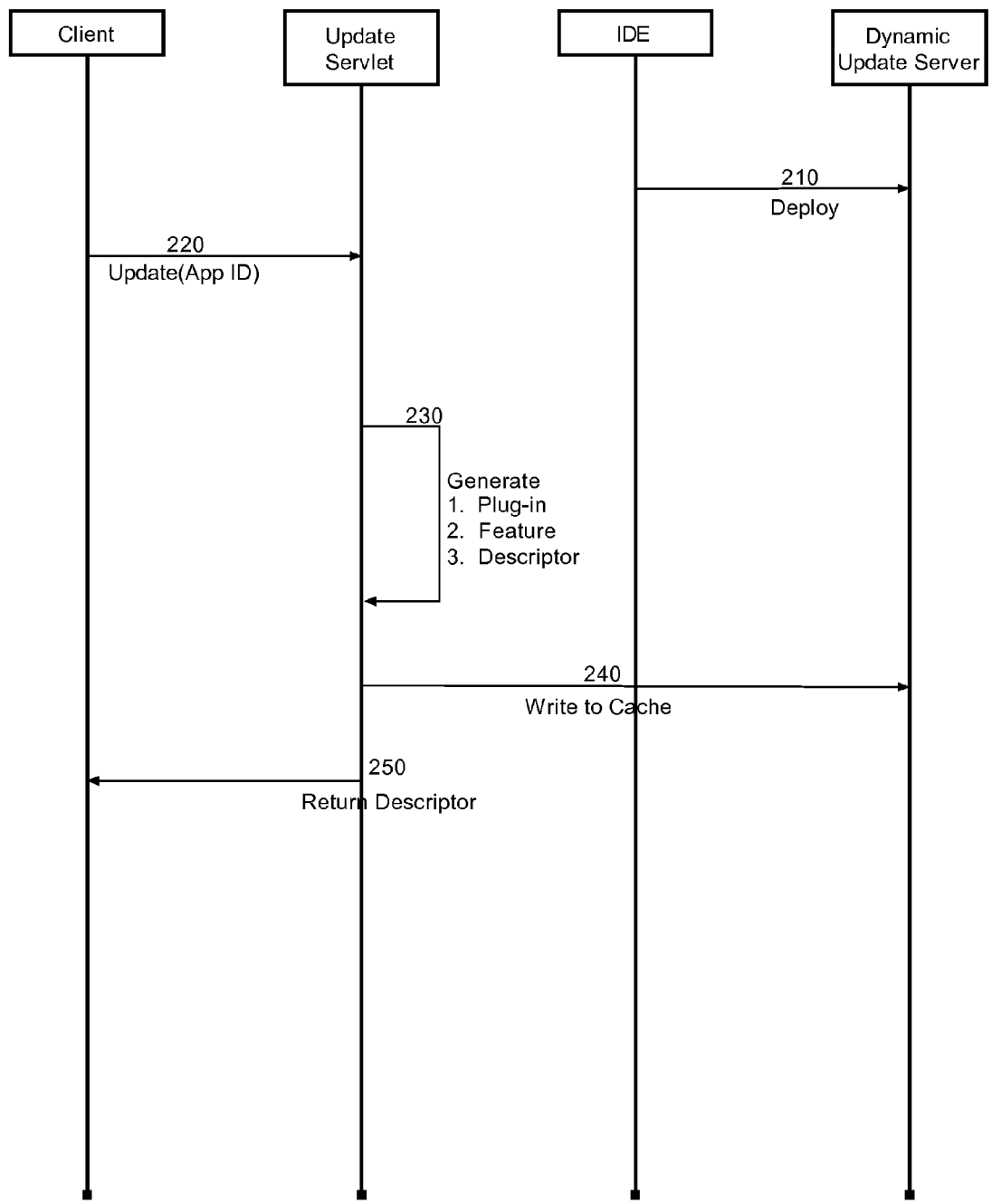

In further illustration, FIG. 2 is a flow diagram illustrating a process for deploying installable software artifacts in canonical form. Beginning in path 210, the IDE can deploy a collection of artifacts in canonical form within an archive to a deployment storage location within the dynamic update site server. Thereafter, the deployment storage location can be associated with an application identifier for the archives In path 220, a request to first time provision or update the application associated with the application identifier and target platform can be forwarded from a client to the update servlet. The update servlet can process the request by extracting from the request the application identifier and target platform.

The update servlet in path 230 can locate the specified deployment storage location by reference to the application identifier. Using the artifacts within the specified deployment storage location, the update servlet can generate one or more plug-ins, a feature and a descriptor for the artifacts. Thereafter, in path 240 the update servlet can write the plug-ins, feature and descriptor to a cache coupled to the dynamic update site server. Finally, in path 250 the update servlet can return the descriptor to the client in path 270.

The skilled artisan will then recognize that installable software artifacts can be stored in an update site repository in the dynamic update site server canonical form that remains independent of the platform on which the artifacts are to be installed. Thereafter, the canonical form of the artifacts can be dynamically translated into a target-specific form at request time according to the application identifier and target platform in the request. In consequence, a single form of an update can be deployed only once to the dynamic update site that services many different types of target platforms.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for deploying installable software artifacts in canonical form, the method comprising:
storing artifacts in platform independent canonical form;
receiving in a dynamic update site server executing in memory of a computer, a request from a client for one of a first time provisioning and an update to a specified application for a specific target platform;
locating by the dynamic update site server the stored artifacts according to the specified application;
dynamically generating by the dynamic update site server a feature from the stored artifacts for the specific target platform, the feature comprising a plug-in bundle; and,
performing by the dynamic update site server one of first time provisioning and updating the specified application in the client with the dynamically generated feature.

2. The method of claim 1, wherein storing artifacts in platform independent canonical form, comprises:
packaging the artifacts in canonical form in an archive;
uploading the archive to a storage location in a dynamic update site server; and,
associating the storage location in the dynamic update site server with an identifier for a specified application.

3. The method of claim 2, wherein receiving a request from a client for one of first time provisioning and update to a specified application for a specific target platform, comprises receiving a request from a client for first time provisioning or update to a specified application for a specific target platform, the request comprising an identifier for the specified application.

4. The method of claim 1, wherein locating the stored artifacts according to the specified application comprises locating the stored artifacts by cross-referencing a table of application identifiers to storage locations.

5. The method of claim 1, wherein dynamically generating a feature from the stored artifacts for the specific target platform, comprises dynamically generating each of at least one plug-in from the stored artifacts for the specific target platform, a feature referencing the plug-in and a descriptor referencing the feature.

6. The method of claim 5, further comprising caching each of the plug-ins, feature and descriptor for subsequent use in servicing a request for one of first time provisioning and an update to the specific platform.

7. The method of claim 5, wherein the performing one of first time provisioning and updating the specified application in the client with the dynamically generated feature, comprises returning the descriptor to the client for use in determining which artifacts to retrieve to the client.

8. An application provisioning data processing system comprising:
a computer with at least one processor and memory;
a dynamic update site server executing in the computer and configured for coupling to a plurality of clients in a collaborative environment, the dynamic update site server comprising an application deployment service, a dynamic update site servlet and a deployment artifact storage system;

the application deployment service comprising program code enabled to upload the artifacts in canonical form to a deployment storage location in the dynamic update site server, the dynamic update site servlet comprising program code enabled to locate the artifacts according to an application identifier for a specified application, and to dynamically generate at least one plug-in, a feature for the plug-in and a descriptor for one of first time provisioning, the feature comprising a plug-in bundle, and updating to the specified application as requested by at least one of the clients.

9. The system of claim 8, further comprising a cache of a feature, the corresponding plug-in and a corresponding descriptor utilized for servicing subsequent requests for one of first time provisioning and updates to the specified application.

10. A computer program product comprising a non-transitory computer usable storage medium having computer usable program code for deploying installable software artifacts in canonical form, the computer program product including:

computer usable program code for storing artifacts in platform independent canonical form;

computer usable program code for receiving a request from a client for one of first time provisioning and updating to a specified application for a specific platform;

computer usable program code for locating the stored artifacts according to the specified application;

computer usable program code for dynamically generating a feature from the stored artifacts for the specific platform, the feature comprising a plug-in bundle; and, computer usable program code for performing first time provisioning and updating the specified application in the client with the dynamically generated feature.

11. The computer program product of claim 10, wherein the computer usable program code for storing artifacts in platform independent canonical form, comprises:

computer usable program code for packaging the artifacts in an archive;

computer usable program code for uploading the archive to a deployment storage location in a dynamic update site server; and, computer usable program code for associating the deployment storage location in the dynamic update site server with an identifier for a specified application.

12. The computer program product of claim 11, wherein the computer usable program code for receiving a request from a client for one of first time provisioning and updating to a specified application for a specific platform, comprises computer usable program code for receiving a request from a client for one of first time provisioning and updating to a specified application for a specific platform, the request comprising an identifier for the specified application.

13. The computer program product of claim 10, wherein the computer usable program code for locating the stored artifacts according to the specified application comprises computer usable program code for locating the stored artifacts by cross-referencing a table of application identifiers to deployment storage locations.

14. The computer program product of claim 10, wherein the computer usable program code for dynamically generating a feature from the stored artifacts for the specific platform, comprises computer usable program code for dynamically generating each of at least one plug-in from the stored artifacts for the specific platform, a feature referencing the plug-in and a descriptor referencing the feature.

15. The computer program product of claim 14, further comprising computer usable program code for caching each of the plug-ins, feature and descriptor for subsequent use in servicing a request for one of first time provisioning and updating to the specified application.

16. The computer program product of claim 14, wherein the computer usable program code for performing one of first time provisioning and updating the specified application in the client with the dynamically generated feature, comprises computer usable program code for returning the descriptor to the client for use in determining which artifacts to retrieve to the client.

* * * * *